US008015385B2

(12) United States Patent
Schopp

(10) Patent No.: US 8,015,385 B2
(45) Date of Patent: Sep. 6, 2011

(54) ARRANGEMENTS FOR MEMORY ALLOCATION

(75) Inventor: Joel H. Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 11/758,321

(22) Filed: Jun. 5, 2007

(65) Prior Publication Data

US 2008/0307187 A1 Dec. 11, 2008

(51) Int. Cl.
G06F 12/00 (2006.01)
(52) U.S. Cl. ........ 711/171; 711/170; 711/172; 711/173; 711/209; 711/E12.088
(58) Field of Classification Search .......... 711/171, 711/201
See application file for complete search history.

(56) References Cited

U.S. PATENT DOCUMENTS

| | | | | |
|---|---|---|---|---|
| 5,666,514 | A * | 9/1997 | Cheriton | 711/144 |
| 6,088,777 | A * | 7/2000 | Sorber | 711/171 |
| 6,643,754 | B1 * | 11/2003 | Challenger et al. | 711/171 |
| 7,146,479 | B2 * | 12/2006 | Li et al. | 711/170 |
| 7,181,587 | B1 * | 2/2007 | Hastings | 711/171 |
| 2002/0144073 | A1 | 10/2002 | Trainin et al. | |
| 2004/0215942 | A1 | 10/2004 | Hansen et al. | |
| 2005/0008011 | A1 * | 1/2005 | Georgiou et al. | 370/389 |
| 2006/0069898 | A1 * | 3/2006 | Patel et al. | 711/171 |
| 2006/0112254 | A1 * | 5/2006 | Piper et al. | 711/171 |
| 2008/0104353 | A1 * | 5/2008 | Madisetti | 711/170 |

OTHER PUBLICATIONS

Paul R. Wilson, et al., "Dynamic Storage Allocation: A Survey and Critical Review," International Workshop on Memory Management, Sep. 1995, Department of Computer Sciences, University of Texas at Austin, 78 pages.
Kuth, Donald Ervin, "The Art of Computer Programming. vol. 1, Fundamental Algorithms," 1997, Addison-Wesley, USA, pp. 441-452.
ISR including PCT transmittal, From the International Searching Authority, mailed Sep. 22, 2008, Applicant: International Business Machines Corporation, International Application No. PCT/EP2008/056653, pp. 5.
PCT Written Opinion of International Searching Authority, Applicant: International Business Machines Corporation, International Application No. PCT/EP2008/056653, pp. 5.

* cited by examiner

*Primary Examiner* — Reginald G Bragdon
*Assistant Examiner* — Arvind Talukdar
(74) *Attorney, Agent, or Firm* — Kolisch Hartwell, PC; Steven L. Bennett

(57) ABSTRACT

In one embodiment, a method is disclosed for allocating memory for a processor unit in a group of processing units. The method can include receiving a memory allocation request where the request can indicate a number of binary segments to be stored. The method can determine if the number indicates a nonstandard allocation, and locate an unallocated memory address based on a multiple of the number if the number indicates a nonstandard allocation. The method can also include locating an unallocated memory address from a pool of memory addresses, where the pool of addresses includes the integer multiples of the binary segments and excludes addresses that are two times the number of binary segments such that the address can be utilized to determine the allocation.

19 Claims, 3 Drawing Sheets

ARRANGEMENTS FOR MEMORY ALLOCATION

FIELD OF INVENTION

The present disclosure relates to the field of multi-processor computers and more particularly, to arrangements for managing memory allocation for a processor.

BACKGROUND

One popular multi-unit parallel processor configuration is a single instruction stream, multiple data stream (SIMD) architecture. In a SIMD system, the same instruction is provided to all active processing units. Each processing unit can have its own set of registers along with some means for the processing unit to receive unique data. In newer multiprocessor chips, many small processing units (PU's) sometime called "synergistic processing elements" (SPE's) can be implemented where each SPE is generally a reduced instruction set computer that utilizes a simpler set of instructions. An SPE can have a greatly reduced memory allocation. In a multi-processor configuration each processor can have a relatively small memory allocation such as only 256K of memory.

After the processing unit processes an instruction and produces a result, the result must be stored in this relatively small memory space. This memory will typically be utilized for text, data, and stack, and heap operations. A heap can be a collection of dynamically allocated variables or an area used for allocation of storage whose lifetime is not related to the execution of the current routine and an area allocated by system software and system extensions to hold frequently used instructions. A stack can be a data construct that uses data on a last-in, last-out basis.

Memory allocation hardware and software in larger computers is very complex. However, when smaller processing units and memory systems are utilized, a sophisticated memory allocation algorithm cannot be utilized due to the lack of space for such overhead. Yet, having such a small memory space creates even a greater requirement for efficient usage of memory or memory allocations.

During operation, and when a requestor such as a PU needs to store data or utilize memory, the requestor (i.e. PU) can request a specific amount of memory and a requestee or allocator can process the request and return an address or a block of addresses to the requestor. A requestee can be a PU and may not be dedicated hardware but can be software that runs on the same hardware (i.e. same processing unit). The allocator can identify areas of memory that are available or "freed" and return these addresses to the requestor. The requestor can then send the data to memory, storing the data at the address that was allocated by the allocator. This is commonly referred to as dynamic memory allocation where areas of memory are used then freed and the allocator can track statuses of memory locations and return addresses to a processing unit based on locations in memory that are free. Static memory allocation is faster but inflexible because it has fixed limits.

Data alignment and memory allocation is generally the way data is arranged and accessed in computer memory. Data alignment is a fundamental, yet difficult issue for all modern computers. Different computer languages handle data storage allocation and data alignment very differently where some implementations have considerable overhead and are very complex. Often, a memory system will operate or be optimized to operate (i.e. store and retrieve data) on a sixteen byte basis. This is typically based on the size of the memory bus, register sizes etc. Dealing with smaller data segments can pose significant problems for an allocator. For example, when only four bytes need to be stored, the system may write only four bytes to an area that has 16 byte available. When this occurs and the four bytes are later retrieved, data structure alignment can also create additional inefficiencies.

When returning an allocation for use, the memory allocator will often use some space in front of the allocated memory or elsewhere in a structure for internal use. This is often referred to as a "header." A header typically contains information such as the size of the allocation. Because this header is only used internally by the memory allocator, the header is considered "overhead" and reduces the usable free memory that can be allocated.

SUMMARY OF THE INVENTION

The problems identified above are in large part addressed by methods and arrangements to manage memory. In one embodiment, a method can include receiving a request for a contiguous quantity of memory of a specific size, locating a free memory area large enough to fill the request and returning a pointer to that free memory or an address that is related to the size of the request. The address can be a multiple of the size of the segment. The system can store the data that created the request at the memory address.

In another method embodiment, a system can receive a memory allocation request where the request indicates an amount of data to be stored, determine if the amount of data to be stored is a nonstandard amount and locate an unallocated memory address based on a multiple of the amount of data to be stored, if the amount is a nonstandard amount. If a system is set up on a sixteen byte alignment basis, eight bytes, four bytes, two bytes and one byte could be a non-standard allocation. The same nonstandard allocation can be applied to 128, 64, 32, 8 and 4 byte systems. Locating can also include locating an unallocated memory address from a pool of memory addresses, where the pool of addresses includes integer multiples of the amount of data to be stored and excludes addresses that are multiples of two times the amount of data to be stored.

In one embodiment, a method is disclosed for allocating memory for a processor unit in a group of processing units. The method can include receiving a memory allocation request where the request can indicate an amount of contiguous memory needed to complete execution of an instruction. The method can determine if the indicator or the amount indicates a nonstandard allocation, and locate an unallocated memory address based on a multiple of the amount if the indicator is a nonstandard allocation. The method can also include locating an unallocated memory address from a pool of memory addresses, where the pool of addresses includes the integer multiples of the requested amount and excludes addresses that are two times the amount such that the address can be utilized to determine the allocation size.

In another embodiment, a method is disclosed for allocating memory for a processor unit. The method can include determining a size of a segment to be stored in memory, requesting a memory address to store the segment, receiving a memory address that is a multiple of the size of the segment, and storing the segment at the memory address representing the multiple. Accordingly, the method can align bytes on address boundaries based on an amount of data to be stored. Such arrangements allow a fixed length allocator to store bytes during different clock in the same fixed length allocation thereby compressing the amount of data that can be stored by a standard fixed length allocator.

In yet another embodiment a memory allocation system is disclosed. The system can include a memory having a predetermined allocation size, a processor coupled to the memory to provide a memory allocation request having a number of bytes that is less than the predetermine allocation size, and a memory allocator. Instructions executed by hardware such as a memory allocator can provide at least one memory address of an available memory location in response to the memory allocation request.

The at least one memory address can provide an allocation that is less than the predetermined minimum allocation size but large enough to fulfill the request. In another embodiment, the system can include a transmitter to transmit results to a memory location corresponding to the memory location. The system can also include an encoder to encode data related to the memory allocation. In addition the system can include a tracker to track predetermined allocation sizes are partially filled and a multi-function locator module that can locate addresses that are a function of the byte sizes to be stored.

DETAILED DESCRIPTION OF EMBODIMENTS

The following is a detailed description of embodiments of the disclosure depicted in the accompanying drawings. The embodiments are in such detail as to clearly communicate an invention. However, the amount of detail offered is not intended to limit the anticipated variations of embodiments, but on the contrary, the intention is to cover all modifications, equivalents, and alternatives falling within the spirit and scope of the present disclosure as defined by the appended claims. While specific embodiments will be described below with reference to particular circuit or logic configurations, those of skill in the art will realize that embodiments of the present disclosure may advantageously be implemented with other similar configurations.

As stated above, a processing unit in a multi-processing unit environment may have a small memory allocation such as only 256K. The limited memory will typically be utilized for text, data, and stack and heap operations. Because of this limited memory space and the rarity of the requirement to store small data segments it is not practical to use sophisticated memory allocation algorithms. It can be appreciated that the minimum code for such algorithms is so large and complex that the economics of storing and executing such code can outweigh any saving provided by the efficient memory allocation provided by such a system. Multiprocessor systems typically have smaller processing units where each processing unit has a reduced instruction set. Many available multiprocessor products allocate of memory of such units to be multiples of sixteen bytes and thus, a sixteen byte alignment is often the only methodology supported. Such a simplified memory allocation system that operates in this one dimensional mode is economical but can be greatly improved by utilizing different alignment for when segments to be stored are less than sixteen bytes.

These sixteen byte allocators typically store some form of a header which can also reduce bandwidth and consume a significant amount of memory making these systems less than perfect. Many current systems utilize a four byte header. The header can be utilized to track the allocation needed. This arrangement results in inefficiencies waste when a small number of bytes (in this case less than sixteen) are requested by a processing unit because when one byte requires storage, a four byte header will be stored with the one byte. Such inefficient operation occurs in most embedded processors not only to cell type processors or processing units.

Figure 1:
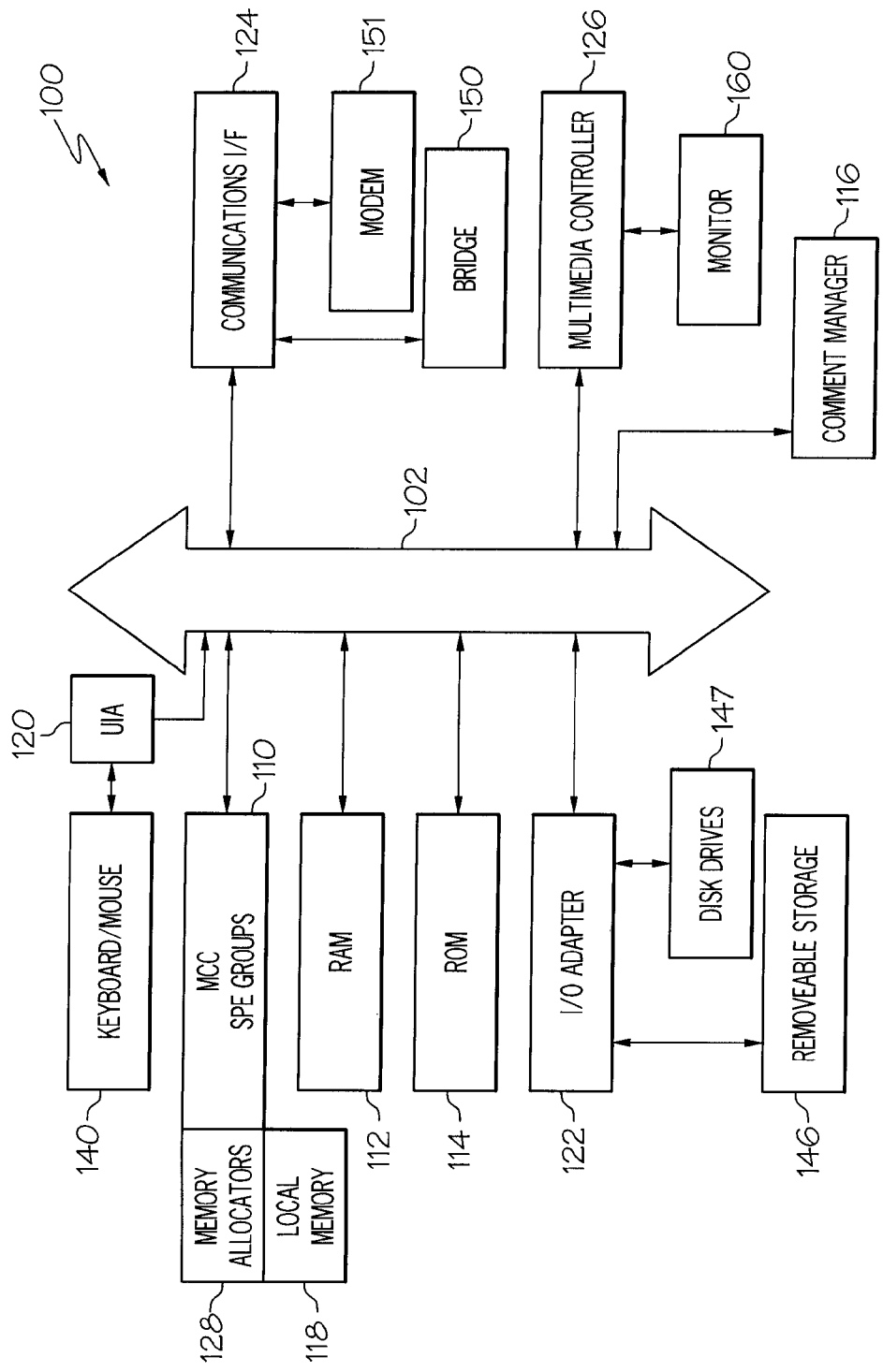
FIG. 1 depicts an embodiment of a processing system.

Turning now to the drawings, FIG. 1 illustrates, in a block diagram format, a multiprocessor processing system 100 with a memory allocator. The system 100 can be a personal computer system, a high performance video system, or a server to name a few. The disclosed system 100 can utilize a memory allocator 118 to store instructions and align such data based on the size of, or amount of the data to be stored. Generally, the system 100 is one of many systems that can implement the efficient memory allocation arrangement disclosed herein.

The system 100 can execute an entire suite of software that runs on an operating system, and the system 100 can perform a multitude of processing tasks using the Multi-Core Cell (MCC) 110 in accordance with the loaded software application(s). Although a single system will be described herein, workstations or mainframes and other configurations, operating systems or computing environments would not part from the scope of the disclosure.

The MCC 110 can also include synergistic processor units which may be a proprietary data processor, a memory allocator 128 and memory including local memory 118, random access memory 112 and read only memory 114. The system 100 can further include an input output adapter 122, a user interface adapter (UIA) 120, a communications interface adapter 124, and a multimedia controller 126.

The input output (I/O) adapter 122 can be connected to, and control, disk drives 147, printers (not shown), removable storage devices 146, as well as other standard and proprietary I/O devices. The UIA 120 can be considered to be a specialized I/O adapter. The UIA 120 as illustrated is connected to a mouse 140 and a keyboard 141. In addition, the UIA 120 may be connected to other devices capable of providing various types of user control such as touch screen devices (not shown).

The communications interface adapter 124 can be connected to a bridge 150, to bridge with a local or a wide area network, and a modem 151. By connecting the system bus 102 to various communication devices, external access to information can be obtained. The multimedia controller 126 will generally include a video graphics controller capable of displaying images upon the monitor 160, as well as providing audio to external components (not illustrated). Generally, memory management arrangements described herein can be executed by the memory allocator 128. Memory allocator 128 can allocate memory locations for processing units that request memory to store results of executed instructions and data.

The memory allocator 128 can operate more efficiently than traditional allocators and can increase the density of data storage in the local memory 118. The memory allocator 128 could be integrated with the MCC 110, could be integrated with local memory 118, and/or could be implemented as a separate module on the same integrated circuit as the MCC 110. Further, the memory allocator 128 could be an algorithm run by a processing unit such as the SPEs contained in MCC 110.

Arrangements to efficiently manage and allocate memory locations and store data with low hardware and executional overhead are disclosed. In one embodiment, "headerless"

communications or communications with a reduced header can be utilized to move data from the MCC 110 to the local memory 118 and from local memory 118 to the MCC 110. When the MCC 110 has data to be stored, portions of the MCC 110 can request a memory address to such data and the request from the MCC 110 can include a number of bytes that the MCC 110 has to store in the local memory 118. The memory allocator 128 can return a memory address, where the actual address or "number" returned by the allocator 128 is based on the number of bytes to be stored such that the stored data will be aligned based on the number of bytes that are to be stored together.

Figure 2:
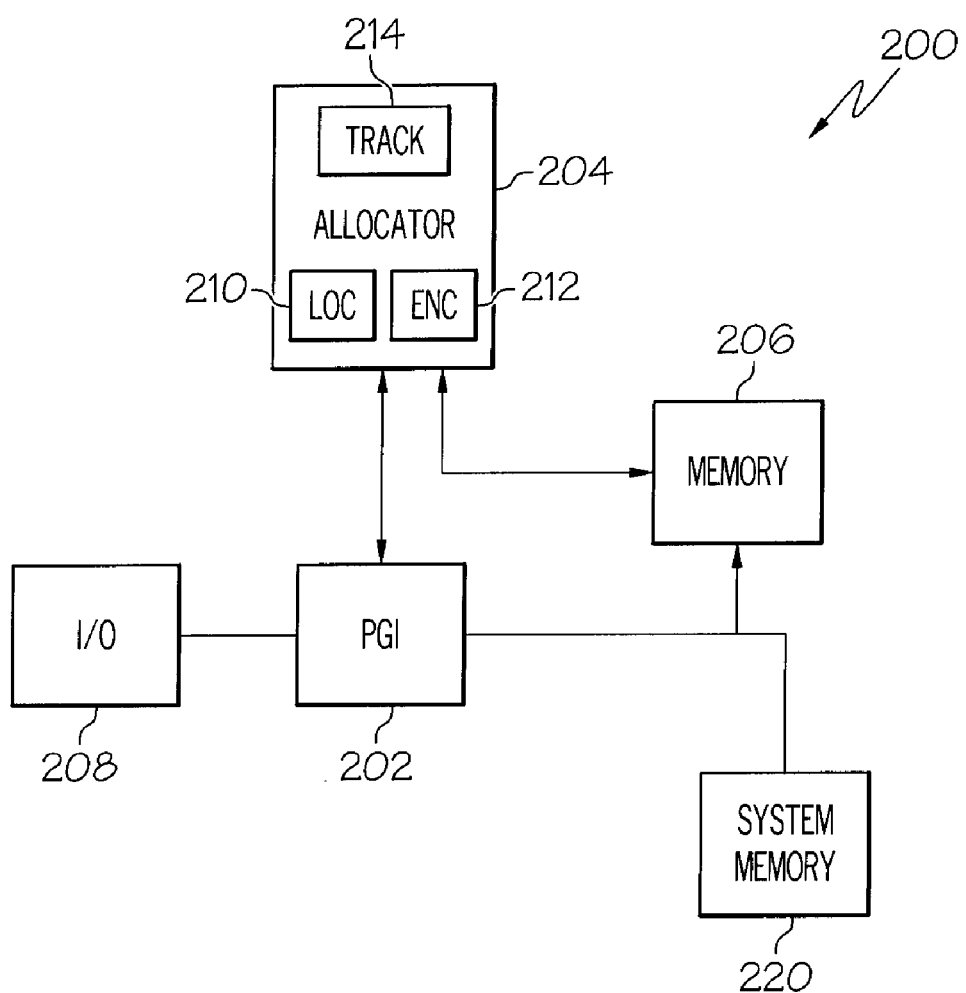
FIG. 2 depicts a block diagram of a memory allocation system.

Referring to FIG. 2, a block diagram of a simplified configuration of a processing module 200 is disclosed. The module 200 can include a single processing unit 202 with memory and a dedicated allocator 204. The allocator 204 can include a multiplier module (LOC) 210, an encoder 212 and a tracking module 214. In one embodiment, processing unit 202 from a multiprocessor environment can request and accept instructions from a memory such as the system memory 220 and after processing the instruction, results of such processing can be stored in the local memory 206. Thus, in operation processing unit 202 can determine that it needs a memory allocation and can send a request to the allocator 204. The request can include the number of bytes that the processing unit needs to store. The allocator 204 checks for available memory locations having an alignment that is based on the number of bytes to be stored utilizing tracking module 214. When a suitable location in memory 206 is found, the allocator 204 can send this memory address back to the processing unit 202.

The memory allocator 204 can provide data alignment by taking the number of bytes in the allocation request and multiplying this number by a multiplier utilizing the multiplier module 210. The resulting address will provide an alignment based on the number of bytes to be stored. It can be said that the address provided by the allocator 204 can provide a "natural" boundary or alignment based on the number of bytes to be stored. When data is stored at specific locations based on the number of related bytes to be stored, natural boundaries are created such that data can be efficiently retrieved and aligned with the appropriate processing unit when needed in subsequent clock cycles.

The following discussions are provided based on a system that utilizes sixteen byte memory boundaries for exemplary purposes. A sixteen byte basis is utilized because this configuration is commonly utilized in many current multiprocessor systems. However, the disclosure below is to be taken as one example and not as a limitation to any features described herein in any way. For example, the description below can apply to eight, thirty two, sixty four and one hundred twenty eight byte aligned systems. Traditionally, data segments that contain more than sixteen bytes will utilize a sixteen byte alignment where the first bit of the first byte is stored at an address that is a multiple of sixteen. However, traditional configurations can have serious inefficiencies when a data segment having a fraction of sixteen bytes needs to be aligned in memory.

In accordance with the present disclosure, eight bytes can be utilized to align allocations when the processing unit 202 needs eight to fifteen bytes to be allocated, a four byte alignment can be utilized when the processing unit 202 needs to store four to seven bytes and a two byte alignment can be utilized when two and three bytes are to be stored and a one byte alignment can be utilized and when one byte is to be stored. This alignment procedure allows a tighter packing of bytes into memory and also allows for less overhead to provide such alignment.

Memory addresses in computers are provided in a binary format. It is often easier for an individual to understand the binary (base 2) addresses when the address is presented in hexadecimal (base 16) format because 2 *8=16, making each hexadecimal digit represent 8 binary digits. In one example, when a two byteallocation is needed, the allocator 204 can return a memory address or a "number," possibly in hexadecimal, that has or ends in, a multiple of the number of bytes to be stored. Thus, the number of bytes to be allocated, as requested by the processing unit 202, multiplied by an integer, (i.e. 1, 2, 3 . . . ) can be utilized to generate at least the lower bits of the address location for the allocation. For example, when a processing unit requests two bytes an address that could be returned by the allocator 214 could be "two" (for two bytes) times fifty six or 112, which would be 0x70 in hexadecimal as it is customary to put a leading 0x in front of a hexadecimal number to indicate that the address is in hexadecimal format.

This allocation arrangement forms an address boundary that is "natural" to two bytes and thus dynamic address boundaries are provided based on the number of bytes to be stored. In traditional systems, uniform address boundaries (i.e. boundaries of either sixteen or thirty two bytes) would consistently be provided by the traditional memory allocators in such a situation. In accordance with the present disclosure, memory addresses and address boundaries can be provided to processing unit 202 based on the number of bytes that the processing unit 202 has to store.

Placing the boundaries based on the number of bytes to be stored allows, a sixteen byte segment to be populated with various combinations of two, four and eight byte combinations thereby compressing data stored by processing units into a smaller memory area. As stated above, the sixteen byte boundary discussed herein and utilized to describe features of this disclosure is merely one example/standard of address boundaries and the discussion above would work equally well with eight byte, thirty two byte, sixty four byte and one hundred twenty eight byte boundaries.

When sixteen bytes are stored during one clock cycle, the sixteen byte segment can be viewed as homogenous and when less than sixteen byte boundaries are utilized and different combinations of two four and eight bytes are stored in a sixteen byte area, the sixteen byte area can become "non-homogenous."

Further, the bytes stored in this non-homogeneous area can be unrelated. In accordance with the present disclosure, the tracking module 214 in the memory allocator 204 can track or flag each non-homogeneous sixteen byte boundaries in the memory 206 and track usage of memory address locations within each non-homogenous sixteen byte segment such that when non-standard "small" allocations are needed by the processing unit 202, the allocator 204 can provide such locations and the processing unit 202 can utilize these locations to fill memory vacancies utilizing such a "nonstandard" byte alignment.

Accordingly, the tracking module 214 can track memory allocations in accordance with these features and can identify various available partially filled segments within the structured sixteen byte boundaries. When processing unit 202 needs to store a small segment (anything under the standard, 16 bytes in the examples provided) the allocator 204 can provide addresses that have the required small segment capacity by utilizing the byte-size, multiple allocations described herein.

This allows packing of small groups of "odd sized" bytes in a packed configuration within the standard memory allocation size (i.e. 16 bytes herein). These memory segments can be tagged or flagged as a non-homogenous segment of memory and specific addresses which have "numbers" that are multiples of the number of bytes to be stored can be easily located and can be placed in such unconventional locations.

In one example, a two byte segment can be stored based on a two byte alignment (address divisible by two), then subsequently four bytes can be stored utilizing a four byte alignment (address divisible by four) in the same sixteen byte memory allocation. The allocator 204 can locate availability of this four byte sub-standard or "small" segment and return an address that is a multiple of four in the same sixteen byte allocation utilized to store the two bytes. The tracking module 214 can then record that another ten bytes are available in this sixteen byte segment and there ten bytes can shared with the two and four byte segment.

Assuming that the hardware (i.e. 202, 204, 206, and 208) in the above example is designed to efficiently operate as a sixteen byte system, possibly due to a sixteen byte address bus, the above features can pack various segments of unrelated data into the same sixteen byte segment/allocation. Thus, instead of having a single, small segment of data (1, 2, 4 or 8 bytes) consuming an entire sixteen byte field, the system 200 can pack various smaller two, four and eight byte segments into a sixteen byte field/allocation.

In accordance with one embodiment, smaller allocations may not utilize a header in transmissions and may not be required to store a header with the data which is stored. Particularly when small segments such as one byte or two bytes are to be stored, substantial savings can be achieved in overhead including bandwidth of transmissions and in memory usage by forgoing header arrangements. Thus, the size of the header can be reduced or the header can be eliminated and the encoder 212 can encode bits in the lower order bits of the address. Accordingly, the allocator 204 can align small segments of data on "natural" boundaries where these natural boundaries are not multiples of the larger allocation alignment, such as sixteen and thirty two bits and the encoder 212 can encode where the boundaries are located.

Headers typically provide indications of the size of the allocation. If the header is stored somewhere other than directly before an allocation (at an adjacent address), it will typically have the address of the allocation as well, and this further adds to overhead. Headers can have other data such as which thread requested the allocation and other "housekeeping" data but in one embodiment, only the address and size can be stored to reduce the overhead of the disclosed system.

Thus, after receiving a memory allocation request that indicates an amount or size of desired contiguous memory, the allocator 204 can determine if the number indicates a nonstandard allocation. For example, in a sixteen byte environment eight, four, two, and one bytes could be a non standard allocation. The allocator 204 could locate an unallocated memory address based on a multiple of the number of bytes to be stored if the number indicates that the processing unit 202 is making a nonstandard allocation.

In one embodiment, the allocator can locate an unallocated memory address from a pool of memory addresses, where the pool of addresses includes the integer multiples of the binary segments and excludes addresses that are two times the number of binary segments. This way the address will always dictate how many bytes are stored in the allocated field and no header information will be required because the address itself can be utilized to determine the allocation size.

Alternately described, in an address pool embodiment, where the pool is a collection of addresses for a specific nonstandard byte size and the collection includes multiples of the nonstandard byte size but excludes addresses that are multiples of larger nonstandard allocations and the standard allocation size, header information is "redundant." In one "pool" example, when stored data has an address that is a multiple of eight (8), but not a multiple of sixteen (16), the processing unit(s) 202 can determine from the address that the size of that allocation would be at most eight 8 bytes long. For example, 0x208 would hold an 8 byte allocation but not a 16 byte allocation. Likewise, if an address is a multiple of four (4) but not of eight (8) or sixteen (16), the processing unit 202 could determine by the address that the allocation was at most four (4) bytes long. It can be appreciated that the address 0x204 will hold four bytes and the address is also an integer multiple of 4 but not 16. In one embodiment, the allocator 204 can multiply sixteen (16) by an integer and add eight (8) to get an eight (8) byte allocation. The allocator 204 can also get this allocation by just adding eight or by "oring" the value with a standard or sixteen byte multiple.

Thus, for an eight byte allocation a sixteen (16)_byte_value|=eight (8) is one representation or 16_byte_value+=8 may be another useable allocation. As discussed above, with traditional systems if an allocator allocates 16 byte blocks no matter the requested size, then and only then can the allocator add the whole 16 bytes by subtracting to get to the original 16 byte aligned address.

In systems where the header only stores the size of the allocation, the processing unit(s) 202 do not need a header to detect the size of the allocation as the allocation can be determined solely by the address. In such systems, the header can be eliminated because it follows that you do not need redundant data regarding allocation size.

In another embodiment, the system can avoid creating a four byte allocation on addresses that are multiples of eight to provide additional resolution for the processing unit(s) 202. Thus, addresses that are multiples of eight and sixteen can be removed from the list available for four byte allocations. Likewise, addresses that are multiples of 4, 8 and 16 can be removed from the list of available addressed for two byte allocations. Accordingly, when eight bytes are to be allocated, the allocator 204 can do a full eight (8) byte allocation on addresses that are multiples of 8 and not multiples of sixteen. This arrangement can be a preferred way but not an absolute. For example, when a four byte allocation is needed, assuming the allocator 204 cannot find an allocation that is a multiple of 4 but can find an allocation that is a multiple of 8, the allocator 204 can return a larger allocation than was requested and forgoing a header can still make up for the potentially wasted space due to "over allocation."

It can be appreciated that memory allocations can be made for both instructions and data utilizing the disclosed arrangements. Accordingly, there in no hard requirement to achieve a one-to-one mapping between lines of code and bits that code will consume in memory when compiled. However, if each line of code corresponds to a single assembly instruction, and each instruction is a 32-bit instruction, the instructions will equate to four (4) bytes per line, and six (6) lines of code would take 32 bytes or 256 bits. This space would be utilized to store the instructions to process the data and not the data itself. As discussed above, systems with limited memory can allocate memory space to store the instructions to process the data leaving limited remaining space to store the data.

By utilizing natural boundaries (i.e., multiples of the bytes to be stored), the information that would typically be in the header can be encoded into the address or lower order bits of the address. Also, the encoder 212 can ensure that a "headerless" allocation saves four bytes of memory space per small, nonstandard allocation. When a header is eliminated, substantial memory space can be saved and this is particularly true when only a small memory space is allocated for each processing unit 202. To "substitute" for the header boundary data or information such as an indicator, the data is stored utilizing boundary information that can be placed in the lower order of address bits.

During operation of the memory allocation process, after the allocator 204 provides a sixteen byte allocation if the size of the segment to be stored is less than or equal to eight bytes, then the address chosen for storing the instruction or data can be an integer "N" multiplied by eight. If the size of the instruction or data is greater than eight bytes then the allocator 204 can allocate a space by transmitting a header having the assigned address and the size per traditional operation. When an address location that is a multiple of eight is freed, the allocator 204 can add to the list of free locations, for example, address 0xFFFFFFF0, in hexadecimal, which is a multiple of sixteen.

The disclosed arrangement can save four bytes per allocation compared to the sixteen bytes utilized in a traditional sixteen byte only allocation system where the allocator adds a header to the information to track the allocation. In one embodiment, additional code can be added to conventional fixed sixteen byte systems to further subdivide the sixteen byte allocations into smaller allocations without using headers. However, processing smaller instructional segments is not the norm and may occur infrequently. Thus, the code required for these smaller instructional segments may not warrant special treatment and the system could adapt not to use the segmentation code when such small allocations are infrequent.

For example, a 16 byte allocation could be subdivided into a 1 byte, 2 byte, 4 byte, and 8 byte segments (where 1+2+4+8=15) and this arrangement would utilize fifteen of the sixteen bytes allocated.

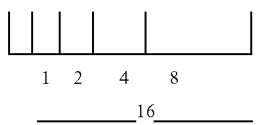

In the illustrated case, the space in memory required to store smaller instruction or data segments is a total of sixteen bytes where a traditional sixteen byte system will allocate 80 bytes because each allocation (the 1, 2, 4, and 8 byte) will take up sixteen bytes. Thus 4×16=64+16 bytes for the header (i.e. 4 headers at 4 bytes each) equals 80. It can be appreciated that the disclosed arrangement provides a 64 byte savings in memory (i.e. 80−16=64).

In another embodiment, as illustrated below, two, one byte allocations, two, two byte allocations, and two, four byte allocations could be packed into a sixteen byte allocation to utilize 14 of the 16 available bytes.

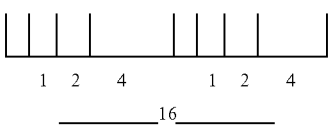

In the case illustrated above, the space or memory required to store the instructions or the small segments of data is sixteen bytes where a traditional system will allocate 120 bytes (6×(16+4)). It can be appreciated that the above arrangement will provide a 104 byte savings in memory (120−16). In the above compressed or "packed" form, the disclosed arrangements can provide a tradeoff between code size and efficiency that is useful for embedded processors like cell type processors that have limited memory resources. As stated above, header type information can be encoded in the address utilized.

Figure 3:
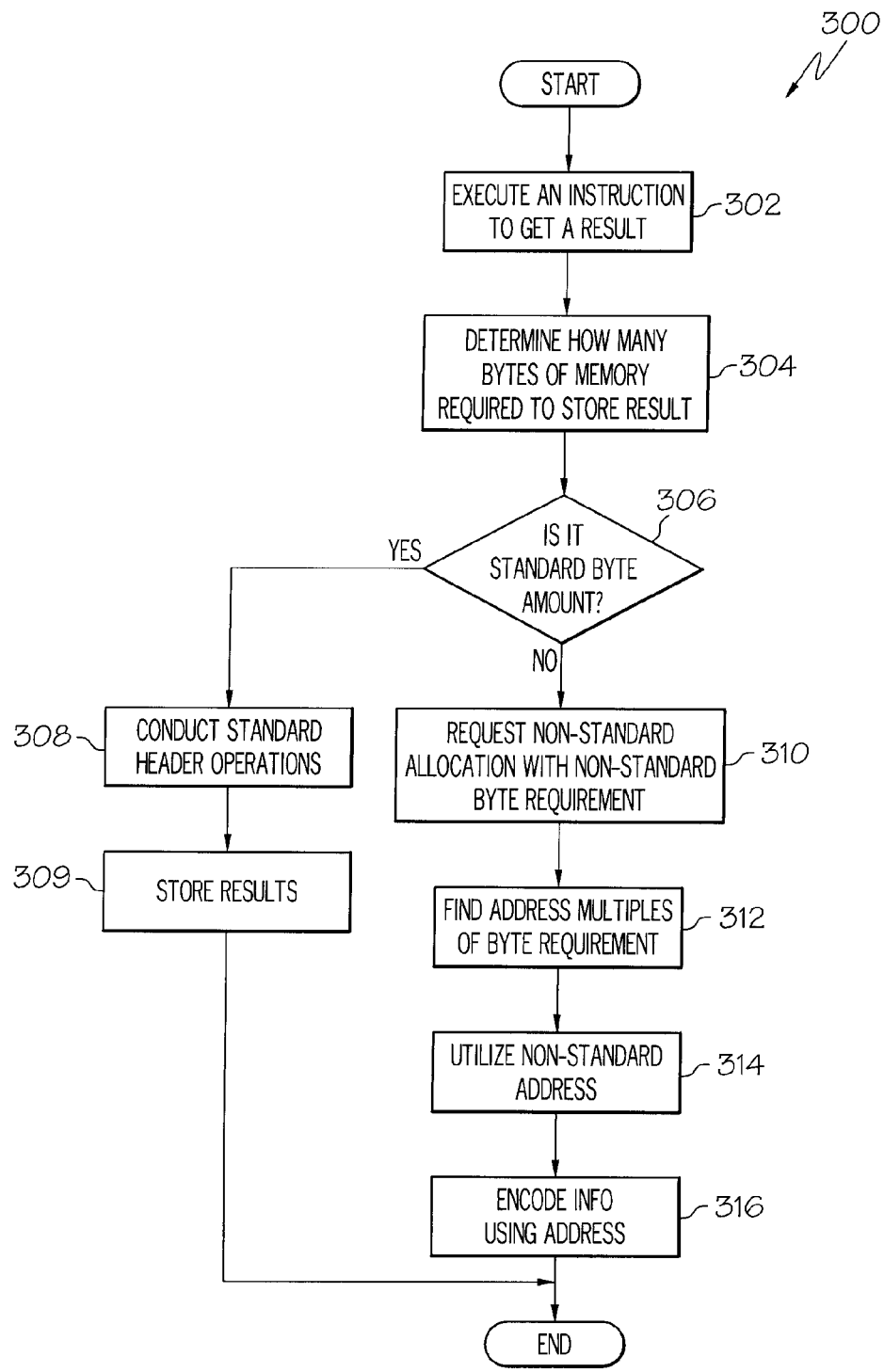
FIG. 3 depicts a flow diagram of memory allocation system.

Referring to FIG. 3, a flow diagram of a method for allocating memory resources is disclosed. As illustrated by block 302, a processing unit from a multi-core platform can execute an instruction and produce a result. As illustrated by block 304, the processing unit can determine how many bytes of memory are required to store the result. At decision block 306, it can be determined if the required number of bytes is a standard byte allocation or close to a standard byte allocation. This can be a specific or predetermined standard and, in one embodiment, it can be a sixteen byte standard.

If the byte allocation meets the standard, meets the predetermined allocation block or is close to the standard, then, as illustrated by block 308, a standard fixed length "headered" allocation can be made and the results can be stored, as illustrated by block 309, and the process can end. If, at decision block 306, the byte allocation required is less than the standard or predetermined length, then, as illustrated by block 310, the processing unit can request a nonstandard allocation that is a multiple of the number of bytes required to store the result.

When two bytes are to be stored, the two bytes can be aligned on an address that is a multiple of two, or the address can have a boundary that is a multiple of eight. When four bytes are to be stored the four bytes can be aligned on an address location having a boundary of a multiple of four. When eight bytes are to be stored the eight bytes can be aligned on a boundary that is a multiple of eight and sixteen bytes can be aligned on an address boundary that is a multiple of sixteen.

As illustrated by block 312, an allocator can find an address that is freed that has the "multiple" required. As stated above the lower order address can be chosen such that it encodes information about the alignment configuration and/or allocation size such that a header can be avoided. As illustrated by block 314, the processing unit can utilize a nonstandard address to store the results and, as illustrated by block 316, information about the alignment can be encoded into the address. The process can end thereafter.

Another embodiment of the disclosure can be implemented as a program product for implementing the arrangements described above. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and arrangements to model behavior of an asynchronous interface. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification.

As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving, by an allocator from a processing unit, a memory allocation request, the memory allocation request indicating an amount of data to be stored;
determining, by the allocator, that the amount of data to be stored is less than an amount of a standard memory allocation and is a nonstandard memory allocation;
determining, by the allocator, an unallocated memory address within an address range for an at least partially unallocated, standard memory allocation by generating at least lower bits of the unallocated memory address based upon an integer multiple of the amount of data to be stored, the unallocated address being an address other than a boundary addresses of the address range for the at least partially unallocated, standard memory allocation, wherein the at least lower bits of the unallocated memory address are indicative of the amount of data to be stored and wherein the unallocated memory address is an integer multiple of a number of binary segments of the data to be stored excluding integer multiples of larger allocation alignments of the number of binary segments; and
transmitting, by the allocator to the processing unit, the unallocated memory address in response to receiving the memory allocation request.

2. The method of claim 1, further comprising storing the data utilizing the unallocated memory address without a header that comprises an allocation size of the nonstandard memory allocation.

3. The method of claim 1, wherein determining the unallocated memory address further comprises locating the unallocated memory address from a pool of memory addresses, wherein the pool of memory addresses comprises addresses that are integer multiples of the amount of data to be stored and excludes addresses that are multiples of two times the amount of data to be stored.

4. The method of claim 1, wherein the standard memory allocation is a sixteen byte allocation of memory space and the nonstandard allocation comprises an eight, a four, a two or a one byte allocation.

5. The method of claim 1, further comprising;
determining, by the processing unit, the amount of data to be stored based on processing of an instruction;
transmitting, by the processing unit, the memory allocation request for the unallocated memory address to store the data, the memory allocation request comprising an indicator of the amount of the data to be stored;
receiving, by the processing unit, the unallocated memory address; and
storing, by the processing unit, the data at the unallocated memory address.

6. The method of claim 1, further comprising locating the unallocated memory address from a pool of memory addresses.

7. The method of claim 1, further comprising determining if the data to be stored is a standard size and providing a standard allocation when the data to be stored is a standard size.

8. The method of claim 1, further comprising storing data of multiple memory allocation requests having nonstandard sizes in the unallocated, standard memory allocation.

9. A system comprising:
a memory;
a processor coupled to the memory to transmit a memory allocation request for a number of bytes that is a nonstandard allocation size; and
a memory allocator module having at least one standard allocation size, coupled with the processor to receive the memory allocation request, to determine an unallocated memory address within an address range for an at least partially unallocated, standard memory allocation by generating at least lower bits of the unallocated memory address based upon an integer multiple of the nonstandard allocation size, the unallocated memory address being an address other than a boundary addresses of the address range for the at least partially unallocated, standard memory allocation, wherein the at least lower bits of the unallocated memory address are indicative of the nonstandard allocation size and wherein the unallocated memory address is an integer multiple of a number of bytes of the memory allocation request excluding integer multiples of larger allocation alignments of the number of bytes of the memory allocation request.

10. The system of claim 9, wherein the memory allocator comprises a transmitter to transmit the unallocated memory address to the processor.

11. The system of claim 9, wherein the memory allocator comprises an encoder to encode the lower order bits of the unallocated memory address.

12. The system of claim 9, wherein the memory allocator comprises a tracker to track the at least partially unallocated, standard memory allocation in response to the partial allocation.

13. The system of claim 9, wherein the memory allocator comprises a locator module to locate addresses that are a function of the byte sizes to be stored.

14. A machine-accessible storage medium containing instructions to allocate memory usage, which when the instructions are executed by a machine, cause said machine to perform operations, comprising:

receiving, from a processing unit, a memory allocation request, the memory allocation request indicating an amount of data to be stored;

determining that the amount of data to be stored is less than an amount of a standard memory allocation and is a nonstandard memory allocation;

determining an unallocated memory address within an address range for an at least partially unallocated, standard memory allocation by generating at least lower bits of the unallocated memory address based upon an integer multiple of the amount of data to be stored, the unallocated memory address being an address other than a boundary addresses of the address range for the at least partially unallocated, standard memory allocation, wherein the at least lower bits of the unallocated memory address are indicative of the amount of data to be stored and wherein the unallocated memory address is an integer multiple of the amount of data to be stored excluding integer multiples of larger allocation alignments of the amount of data to be stored; and transmitting, to the processing unit, the unallocated memory address in response to receiving the memory allocation request.

15. The machine-accessible storage medium of claim 14, wherein determining the unallocated memory address comprises aligning four bytes on a multiple of four address boundary.

16. The machine-accessible storage medium of claim 14, wherein determining the unallocated memory address comprises aligning eight bytes on a multiple of eight address boundary.

17. The machine-accessible storage medium of claim 14, wherein determining the unallocated memory address comprises aligning two bytes on a multiple of two address boundary.

18. The machine-accessible storage medium of claim 14, wherein determining the unallocated memory address comprises encoding boundary information into the address.

19. The machine-accessible storage medium of claim 14, wherein determining the unallocated memory address comprises identifying sizes of freed nonstandard allocations inside the at least partially unallocated, standard memory allocation.

* * * * *